(12) United States Patent
Attaran et al.

(10) Patent No.: US 11,323,155 B2
(45) Date of Patent: May 3, 2022

(54) DECOUPLER FOR NEAR FIELD COMMUNICATIONS INTERFACE MODULE ON VEHICLE CONDUCTIVE SURFACE

(71) Applicant: FORD GLOBAL TECHNOLOGIES, LLC, Dearborn, MI (US)

(72) Inventors: Ali Attaran, Lasalle (CA); Nevin Altunyurt, Atlanta, GA (US); John F. Locke, Waterford, MI (US); Aaron DeLong, Toledo, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/021,351

(22) Filed: Sep. 15, 2020

(65) Prior Publication Data

US 2022/0085846 A1 Mar. 17, 2022

(51) Int. Cl.
*H04B 5/00* (2006.01)

(52) U.S. Cl.
CPC ......... *H04B 5/0031* (2013.01); *H04B 5/0056* (2013.01); *H04B 5/0081* (2013.01); *H04M 2250/04* (2013.01)

(58) Field of Classification Search
CPC .. H04B 5/0031; H04B 5/0056; H04B 5/0081; H04M 2250/04
USPC ........................................................ 455/41.1
See application file for complete search history.

(56) References Cited

U.S. PATENT DOCUMENTS

| | | | |
|---|---|---|---|
| 10,985,465 B2 * | 4/2021 | Singh | H04B 5/0081 |
| 2015/0099462 A1 | 4/2015 | Klassen | |
| 2017/0274936 A1 * | 9/2017 | Ishii | B62D 25/025 |
| 2017/0345536 A1 | 11/2017 | Breiwa et al. | |
| 2019/0121535 A1 * | 4/2019 | Tamane | G07C 9/00896 |
| 2019/0252926 A1 | 8/2019 | Kim et al. | |
| 2019/0273869 A1 * | 9/2019 | Ramalingam | G06T 7/20 |
| 2019/0296439 A1 * | 9/2019 | Kerselaers | H01Q 7/00 |

OTHER PUBLICATIONS

Ian R. O. Connell, et al., MRI RF Array Decoupling Method with Magnetic Wall Distributed Filters, IEEE Transactions on Medical Imaging, vol. 34, No. 4, Apr. 2015, pp. 825-834.

* cited by examiner

*Primary Examiner* — Eugene Yun
(74) *Attorney, Agent, or Firm* — Frank L. Lollo; MacMillan, Sobanski & Todd, LLC

(57) ABSTRACT

A near field communication (NFC) reader module is provided for mounting over a metal panel of a vehicle. A housing of the module is configured to mount adjacent the metal panel. The housing contains a planar array of non-magnetic RF filter elements in the housing proximate to the metal panel. The housing contains a planar antenna coil configured to couple with an external NFC device carried by a user, wherein the array of RF filter elements is disposed between the planar antenna coil and the metal panel to magnetically decouple the planar antenna coil from the metal panel. The housing further contains receiver circuitry configured to decode NFC signals from the external NFC device.

20 Claims, 4 Drawing Sheets

DECOUPLER FOR NEAR FIELD COMMUNICATIONS INTERFACE MODULE ON VEHICLE CONDUCTIVE SURFACE

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to automotive security systems, and, more specifically, to an NFC card reader for obtaining access to, and controlling activation of, a transportation vehicle such as a motor vehicle.

Keyless entry and push button start are popular features on passenger vehicles, such as cars and trucks. Instead of a traditional mechanical key, a user carries a device (e.g., a key fob or a smartphone) which wirelessly authenticates the user to gain access to the vehicle (e.g., door unlocking), to activate the vehicle (e.g., ignition of a combustion engine or activating an electric vehicle powertrain), and to perform other functions.

Near field communications (NFC) is one type of wireless interface being used because the very short transmission range makes it difficult for third parties to intercept and copy security data. NFC hardware is included in many smartphones, so that an appropriate app installed on the smartphone can be configured to operate as a smart key for the user. In addition, dedicated NFC-based key fobs are also in use. In the case of a key fob, a batteryless RFID device can be used which obtains its power from the vehicle during a reading operation. Digital key protocols maintain vehicle security while enabling sharing and management of vehicle access. For example, a Digital Key standard has been published by the Car Connectivity Consortium.

For an NFC-based security system of a vehicle, the portable NFC unit carried by the user communicates with a fixed NFC unit (e.g., an NFC card reader) mounted to the vehicle. An NFC reader for gaining access to the vehicle (e.g. for unlocking a door) may be mounted under a B pillar applique (e.g., on the vertical pillar located between the windows of a front door and a rear door on one side of the vehicle). Such a location is in close proximity to (e.g. fastened onto) a body panel made of sheet metal. Inside the vehicle, access to other functions such as starting a vehicle ignition may be controlled via a NFC card reader mounted to an interior metal panel such as a dash panel. Because the antenna coil of the NFC card reader is near an underlying metal panel, eddy currents are induced within the metal panel which create an opposite magnetic field that cancels some of the antenna coil's flux, resulting in a reduction in the coupling between the antenna coils of the NFC reader and the mobile device. Consequently, a large reduction in reading range or efficiency of the NFC system may result.

One typical approach to mitigate this undesired coupling is to use a ferrite sheet (e.g., a magnetic shield formed of magnetizable, nonconductive material) between the reader and the body panel. Although the magnetic permeability of the ferrite helps guide the flux and reduces the eddy currents, the ferrite material is relatively expensive. Moreover, the performance of the ferrite sheet can be unreliable because the permeability of the ferrite is temperature dependent. Since vehicle systems are required to operate over a large temperature range, an affordable ferrite sheet cannot provide the proper decoupling over the entire temperature range.

SUMMARY OF THE INVENTION

The invention uses a "magnetic wall" formed of non-ferrite material to avoid the large reduction in reading range or efficiency of the NFC system which is usually caused by the underlying body panel made of sheet metal. A superior magnetic shielding effect is obtained without the temperature dependence associated with ferrite sheets. The invention is easily fabricated at low cost and without added complexity to the card reader unit. The shielding structure can be formed on the back face of a conventional PCB substrate having the NFC reader coil on the front face, for example.

In one aspect of the invention, a near field communication (NFC) reader module is provided for mounting over a metal panel of a vehicle. A housing configured to mount adjacent the metal panel contains a planar array of non-magnetic RF filter elements in the housing proximate to the metal panel. The housing contains a planar antenna coil configured to couple with an external NFC device carried by a user, wherein the array of RF filter elements is disposed between the planar antenna coil and the metal panel to magnetically decouple the planar antenna coil from the metal panel. The housing contains receiver circuitry configured to decode NFC signals from the external NFC device.

DETAILED DESCRIPTION OF PREFERRED EMBODIMENTS

NFC Entry and Starting functions enable a user to unlock and start their vehicle using an NFC-enabled device (e.g., key card or smartphone) as a vehicle key. To unlock the vehicle, the user holds their NFC-enabled device near an exterior NFC reader of the vehicle. To authorize start (e.g., ignition of a combustion engine or activation of an electric drivetrain) and drive the vehicle away, the user holds their NFC-enabled device near, or places it on, an interior NFC reader of the vehicle.

Figure 1:
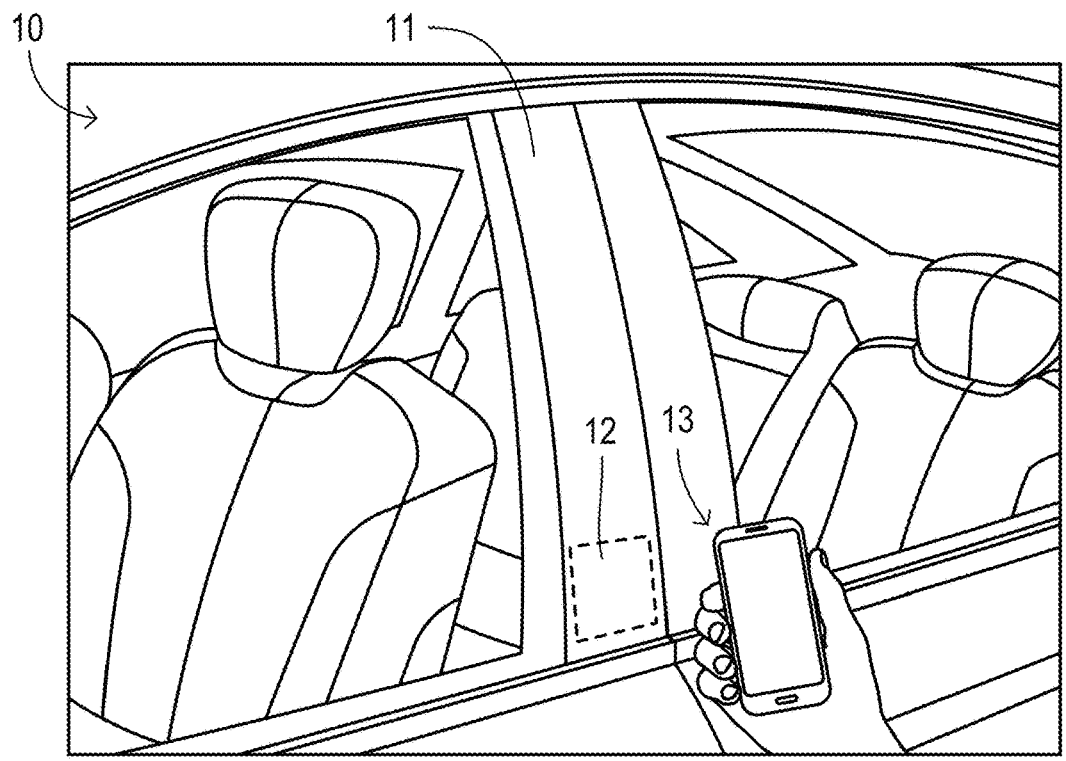
FIG. 1 depicts a vehicle system having keyless entry using an NFC card reader installed on a B pillar interacting with a mobile device in the form of a smartphone.
Figure 2:
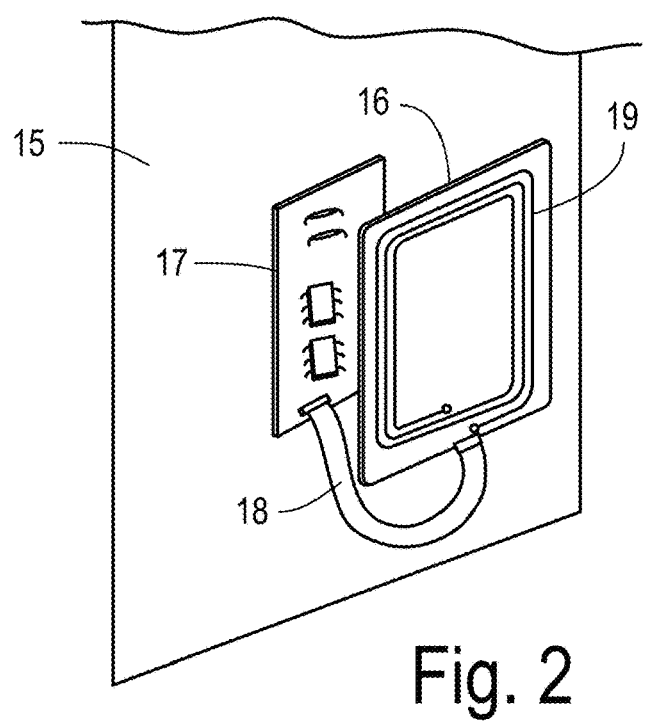
FIG. 2 is a perspective, exploded view of a portion of a card reader in relation to a sheet metal panel.

Referring to FIG. 1, a vehicle 10 includes a B pillar 11 containing an NFC card reader unit 12 (preferably fastened to an underlying sheet metal body panel and covered by a decorative applique). A mobile NFC unit, such as a smartphone 13, can be brought into close proximity to reader unit 12 in order to exchange wireless signals including a Digital Key for accessing secure features of vehicle 10. FIG. 2 shows sheet metal body panel 15. Reader unit 12 includes a reader coil antenna board 16 connected to a main electronics board 17 by a cable 18. Antenna board 16 may include a substrate carrying conductive trace(s) 19 following a coil path to form an NFC antenna. Due to the close placement of the NFC antenna coil trace 19 to sheet metal 15, antenna performance could be degraded.

Figure 3:
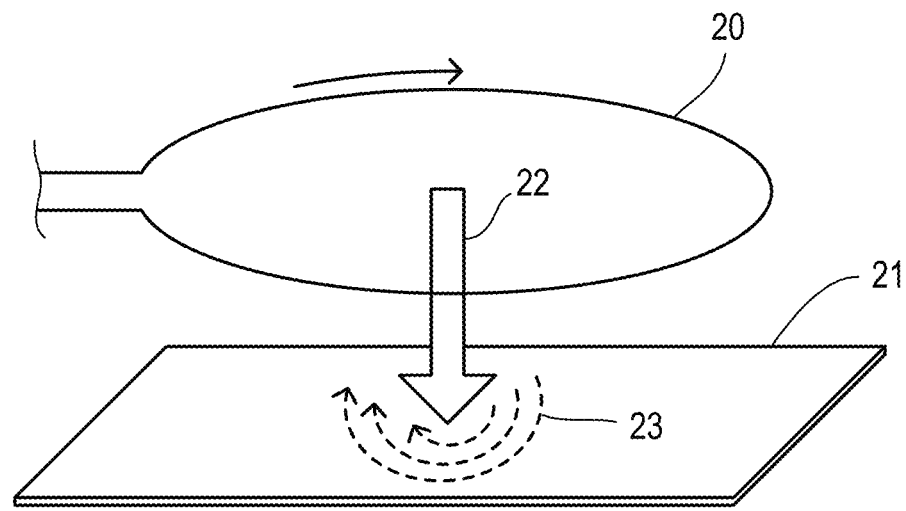
FIG. 3 shows eddy currents induced in a sheet metal panel by current flowing in an antenna coil.
Figure 4:
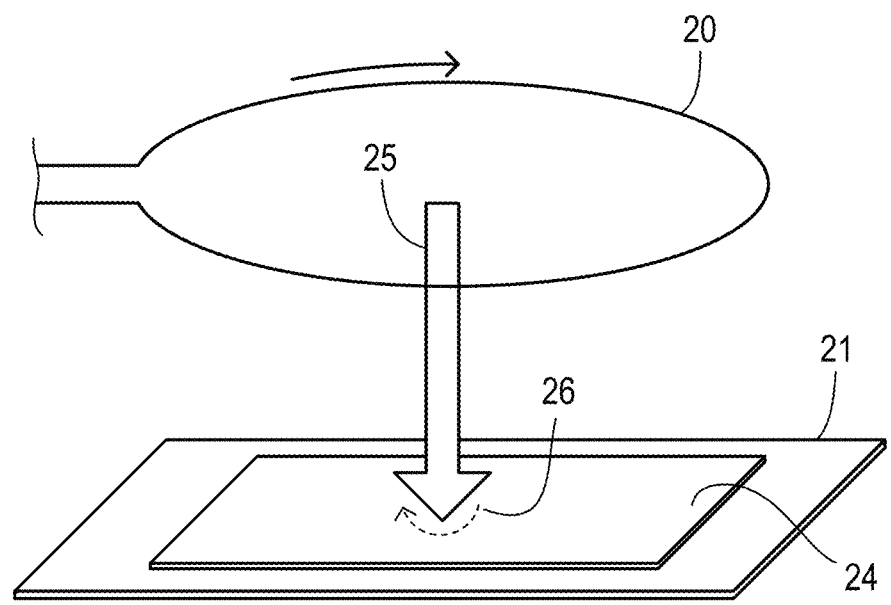
FIG. 4 shows reduction of eddy currents by insertion of a ferrite sheet between the antenna coil and sheet metal panel of FIG. 3.

FIG. 3 shows a planar antenna coil 20 disposed over an electrically conductive sheet 21. When a current flows in coil 20, a magnetic field 22 is induced which cuts perpendicularly through sheet 21. Since the antenna current alternates, a changing magnitude of magnetic field 22 induces a circular flow of Eddy currents 23 in sheet 21. In turn, Eddy currents 23 induce a magnetic field that is in opposition to magnetic field 22, thereby suppressing the antenna current and reducing the efficiency of transferring NFC signals to the NFC reader unit. A known solution to mitigate the loss of efficiency has been to insert a ferrite sheet 24 shown in FIG. 4 between coil 20 and conductive sheet 21. Ferrite sheet 24 is magnetizable but electrically insulating. The magnetic field 25 induced by the current in coil 20 is diverted from conductive sheet 21, and a much smaller Eddy current 26 means that any canceling magnetic field induced by Eddy currents is greatly reduced as long as the temperature remains in a range where the flux carrying capacity of the ferrite sheet is sufficient. For practical ferrite materials, however, such a temperature range may not be maintainable in an automotive environment.

Figure 5:
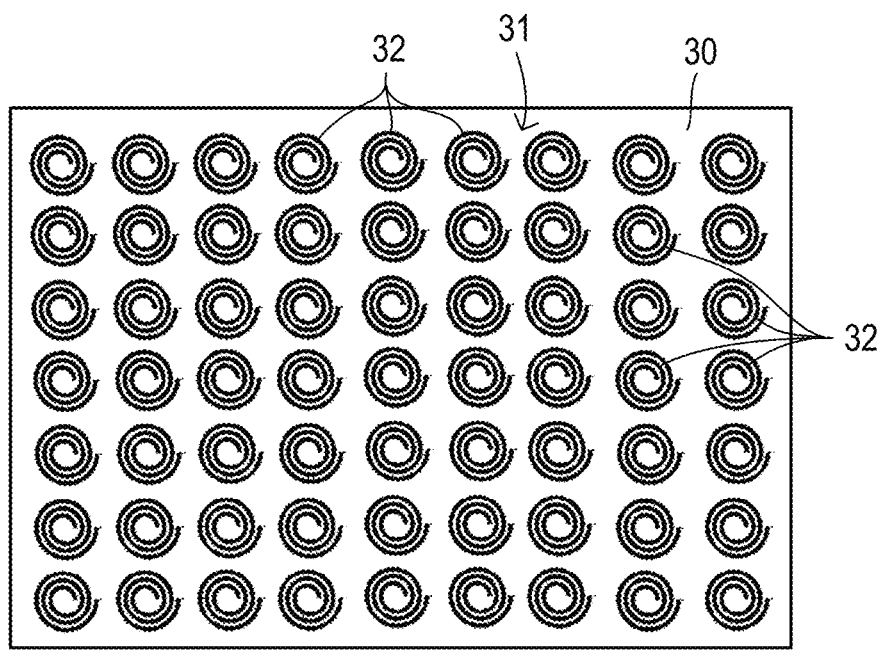
FIG. 5 is a plan view showing an array of RF filter elements on a substrate.

The present invention uses non-magnetic (e.g., non-ferrite) materials to block the magnetic field of the NFC coil from reaching the sheet metal body panel. Only electrically conductive structures are required, so that performance is substantially unaffected by temperature. In particular, a distributed open-ended spiral resonator array can be used to mimic the ferrite response and eliminate the NFC reader coupling to the sheet metal of the car body. As shown in FIG. 5, a substrate 30 carries an array 31 of a plurality of rows and columns of RF filter elements 32. Each RF filter element forms a multi-loop coil (e.g. spiral) which is electrically isolated from the surrounding filter elements. Each RF filter element is designed to provide a self-resonant frequency coinciding with a frequency in the frequency band used by the NFC signals (e.g., about 13.56 MHz). Acting in concert, RF filter elements 32 create an RF stopband at frequencies around the self-resonant frequency and spatially across array 31 which shields the underlying sheet metal from the NFC signals and avoids the generation of Eddy currents. RF filter elements 32 can be easily fabricated as circuit traces on the back face of a printed circuit board (PCB) carrying the reader coil using conventional PCB techniques with minimal additional cost and no added complexity for the implementation. Like the antenna coil, copper can be used for the fabrication of the RF filter elements with negligible temperature dependency.

Since energy transfer and data communication are both important for NFC operation, it is desirable to maximize the coupling coefficient between the antenna coils of the NFC reader and the NFC mobile device (e.g., to support good power transfer to an RFID card over a useful reading range). The coupling factor is the ratio of magnetic flux picked up by the mobile card divided by magnetic flux generated by the reader which can be calculated as follows:

$$k = \frac{M}{\sqrt{L_1 L_2}}$$

where M is the mutual coupling of the reader and card coils and $L_1$ and $L_2$ are the self-inductance of card and reader coils, respectively. A typical NFC antenna coil in a mobile NFC device such as a smartphone may include rectangular windings formed of copper traces with a width of 0.5 mm spaced apart by 0.5 mm and with 2 winding turns covering an area of 68.3 mm by 51.9 mm. An example NFC reader antenna coil includes square windings formed of copper traces with a width of 0.5 mm spaced apart by 0.5 mm and with 3 winding turns covering an area of 40 mm by 40 mm. In simulations using the foregoing dimensions for the antenna coils both with and without the presence of the body sheet metal, it is found that the coupling coefficient decreases from about 17.85% to about 8.99% when the sheet metal is present because of the flux cancellation effect of the sheet metal.

To obtain a self-resonant frequency of about 13.56 MHz, RF filter elements 32 shown in FIG. 5 may be formed as spiral resonators having an inner radius of 1.6 mm formed with 3 turns of a copper trace with a width of 0.5 mm and the turns being separated by 0.5 mm. The dimensions and turns of an RF filter element can be determined by solving Maxwell equations according to the desired self-resonant frequency. To maintain effective shielding and for ease of fabrication, each spiral element is separated from adjacent elements by 1.6 mm. Including in the simulations the array 31 with RF filter elements 32 spanning an area between the sheet metal and reader antenna coil, the coupling coefficient is restored back to 17.85%, thereby eliminating the strong coupling between the coils and the body sheet metal.

Figure 6:
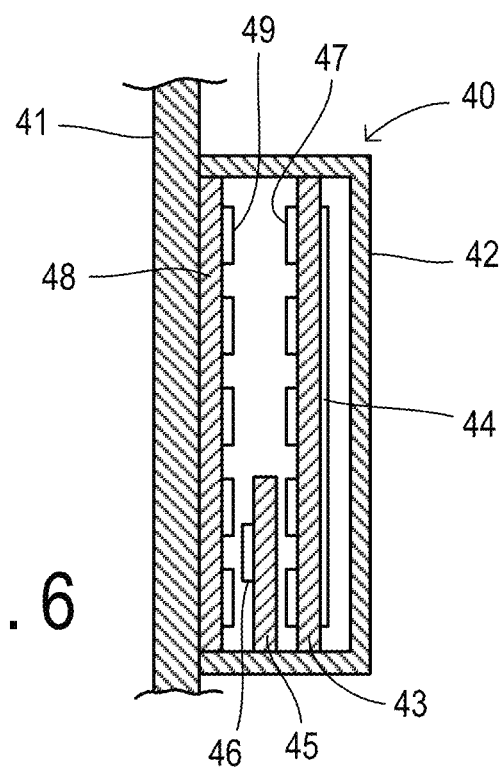
FIG. 6 is a side cross-sectional view of an NFC card reader module on a body panel.

FIG. 6 shows an NFC reader module 40 mounted over a metal panel 41. Module 40 includes a housing 42 such as a molded plastic box or receptacle. A substrate 43 (e.g., of a printed circuit board) has conductive traces 44 defining a planar antenna coil which is configured to couple with an external NFC device (e.g., RFID card or a smartphone) carried by a user. Substrate 43 is mounted in housing 42 so that the antenna coil of trace 44 is adjacent an exterior side of housing 42 so that the user can place the mobile device nearby. Another PCB substrate 45 carries receiver circuitry (e.g., an integrated circuit 46) configured to decode NFC signals from the external NFC device as known in the art. A planar array 47 of non-magnetic RF filter elements are also disposed in housing 42 and on an interior (back-facing) side of substrate 43. Array 47 is proximate to the metal panel (i.e., array 47 is disposed between metal panel 41 and the planar antenna coil of trace 44) in order to magnetically decouple the planar antenna coil from the metal panel. Instead of being formed on substrate 43, the RF blocking "wall" can be formed as a separate component. For example, a substrate 48 at a bottom side (or forming a bottom side) of housing 42 can be used to carry an array 49 of RF filter elements. Furthermore, a substrate carrying both the array of RF filter elements and some or all of the receiver circuitries could be utilized.

Figure 7:
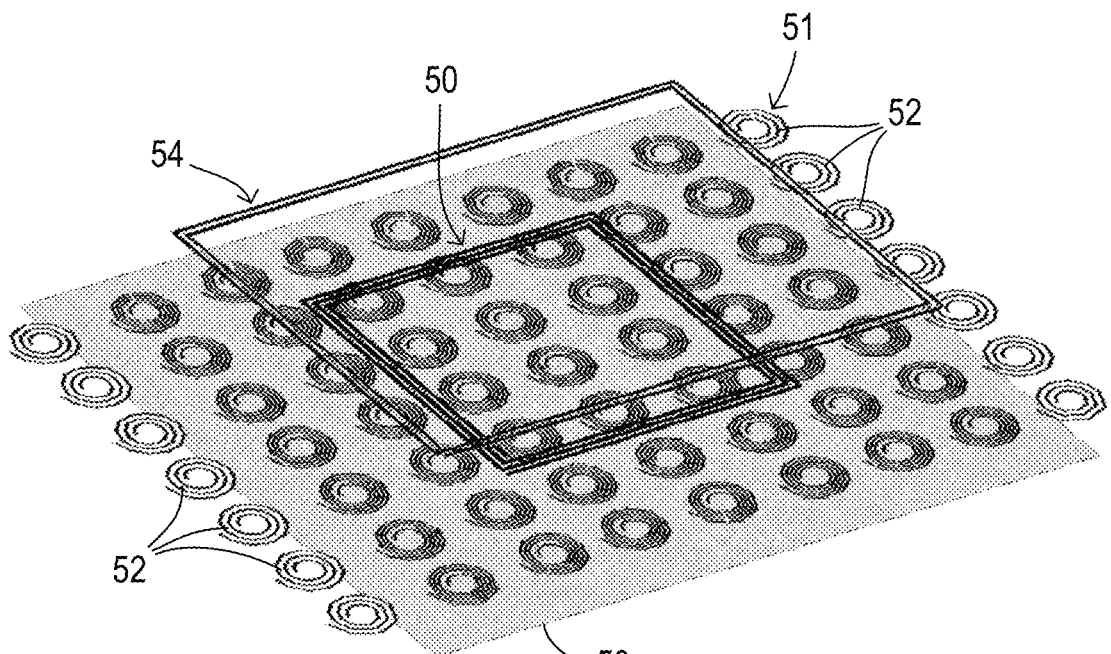
FIG. 7 is a perspective view showing a spatial relationship of NFC antenna coils and an array of RF filter elements during a reading operation.

FIG. 7 shows a spatial relationship of portions of a vehicle, card reader, and mobile device during NFC communication. A reader coil 50 is at the top of the fixed vehicle structures. Beneath and adjacent to reader coil 50 is an array 51 of RF filter elements 52, separating reader coil 50 from a vehicle sheet metal panel 53. Above reader coil 50 is a mobile antenna coil 54 of a handheld device that is placed by the user in close proximity to enable near field communication.

Figure 8:
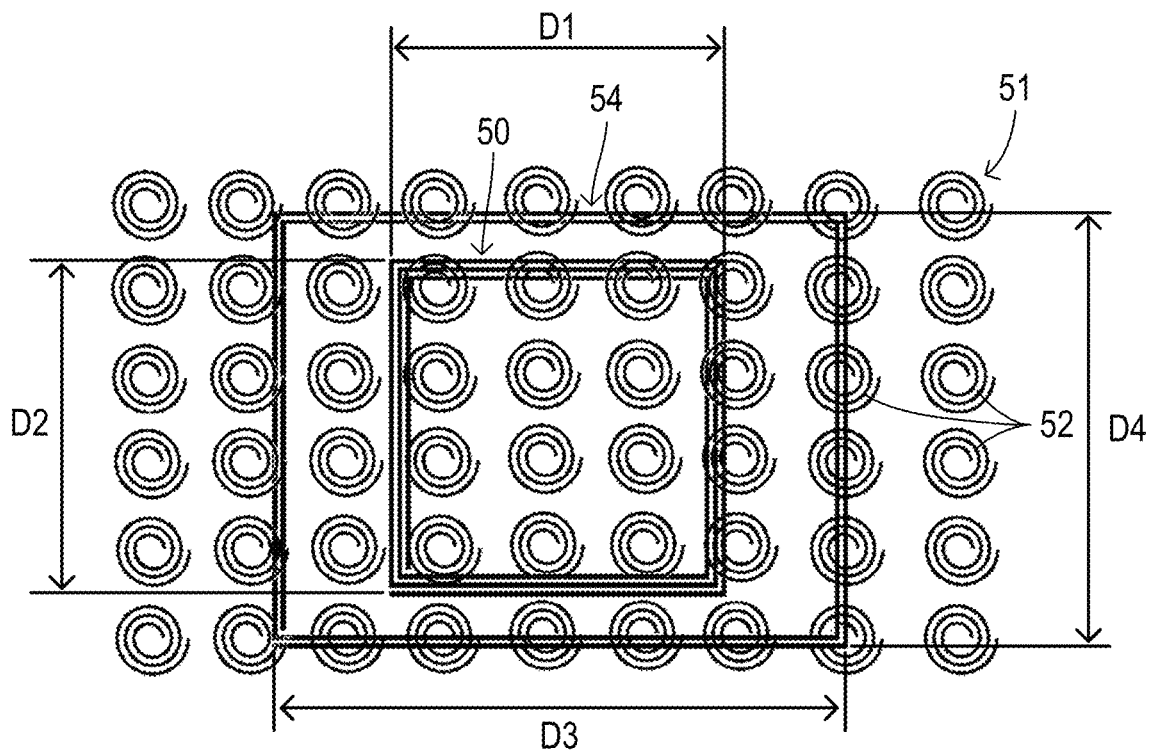
FIG. 8 is a plan view of the antenna coils and RF filter elements of FIG. 7.

As shown in FIG. 8, RF filter elements 52 are distributed over a predetermined region defined by the outermost rows and columns of array 51. Reader antenna coil 50 has a horizontal extent D1 and a vertical extent D2, defining a corresponding footprint. The number of rows and columns in array 51 is chosen such that the predetermined region has an extent greater than the extent of the footprint of antenna coil 50. Since RF filter elements 52 are disposed over an area extending laterally beyond the footprint, the decoupling of antenna coil 50 from the sheet metal is complete. To assist in manual alignment, the size of antenna coil 54 of the mobile device is larger than the size of antenna coil 50. Antenna coil 54 has a horizontal extent D3 and a vertical extent D4. In some embodiments, the predetermined region of RF filter elements 52 may also be greater than the extents of mobile antenna coil 54 for maximizing coil coupling even when the coils are not precisely aligned.

What is claimed is:

1. Vehicle apparatus comprising:
    a metal panel disposed at a surface of a vehicle; and
    a near field communication (NFC) reader unit mounted adjacent the surface and the metal panel comprising:
        a planar antenna coil configured to couple with an external NFC device carried by a user;
        receiver circuitry configured to decode NFC signals which are received by the planar antenna coil from the external NFC device; and
        a planar array of non-magnetic open-ended RF filter elements disposed between the metal panel and the planar antenna coil.

2. The vehicle apparatus of claim 1 wherein the planar array of filter elements is comprised of a substrate carrying a plurality of coil traces distributed over a predetermined region.

3. The vehicle apparatus of claim 2 wherein the predetermined region has an extent greater than an extent of the planar antenna coil.

4. The vehicle apparatus of claim 2 wherein each coil trace is electrically isolated.

5. The vehicle apparatus of claim 2 wherein each coil trace is comprised of a spiral track.

6. The vehicle apparatus of claim 1 wherein each RF filter element is comprised of a respective self-resonant coil trace having a self-resonant frequency coinciding with a frequency of the NFC signals.

7. The vehicle apparatus of claim 6 wherein the RF filter elements are disposed over an area extending laterally beyond a footprint of the planar antenna coil.

8. The vehicle apparatus of claim 1 wherein the metal panel is comprised of sheet metal forming an exterior body surface of the vehicle.

9. The vehicle apparatus of claim 8 wherein the exterior body surface is a B-pillar.

10. The vehicle apparatus of claim 8 wherein the metal panel is comprised of a dash panel in an interior of the vehicle.

11. A near field communication (NFC) reader module for mounting over a metal panel of a vehicle, comprising:
    a housing configured to mount adjacent the metal panel;
    a planar array of non-magnetic open-ended RF filter elements in the housing proximate to the metal panel;
    a planar antenna coil configured to couple with an external NFC device carried by a user, wherein the array of RF filter elements is disposed between the planar antenna coil and the metal panel to magnetically decouple the planar antenna coil from the metal panel; and
    receiver circuitry configured to decode NFC signals which are received by the planar antenna coil from the external NFC device.

12. The module of claim 11 wherein the planar array of filter elements is comprised of a substrate carrying a plurality of coil traces distributed over a predetermined region.

13. The module of claim 12 wherein the predetermined region has an extent greater than an extent of the planar antenna coil.

14. The module of claim 12 wherein each coil trace is electrically isolated.

15. The module of claim 12 wherein each coil trace is comprised of a spiral track.

16. The module of claim 11 wherein each RF filter element is comprised of a respective self-resonant coil trace having a self-resonant frequency coinciding with a frequency of the NFC signals.

17. The module of claim 16 wherein the RF filter elements are disposed over an area extending laterally beyond a footprint of the planar antenna coil.

18. The module of claim 11 wherein the metal panel is comprised of sheet metal forming an exterior body surface of the vehicle.

19. The module of claim 18 wherein the exterior body surface is a B-pillar.

20. The module of claim 18 wherein the metal panel is comprised of a dash panel in an interior of the vehicle.

* * * * *